Patented Nov. 19, 1935

2,021,520

UNITED STATES PATENT OFFICE 2,021,520

METHOD OF MAKING BODIES CONSISTING OF METALLIC OXIDES

Reinhold Reichmann, Berlin, Germany, assignor to Siemens & Halske Aktiengesellschaft, Siemensstadt, near Berlin, Germany, a corporation of Germany No Drawing. Application July 7, 1933, Serial No. 679,311. In Germany July 15, 1932

6 Claims. (Cl. 25—156)

My invention relates to a method of making bodies consisting of metallic oxides.

Highly sintered bodies of pure metallic oxides, particularly alumina, are of such compact structure as to be completely free of pores; they are highly heat-conductive, withstand chemical attacks and also have a high electric resistance at a high temperature.

For a variety of purposes it is, however, desirable to take advantage of the excellent properties of pure metallic oxides or some of these properties, particularly of the oxides of aluminum, beryllium, chromium, manganese, zirconium, hafnium, magnesium or of mixtures or compounds of these oxides in the form of porous bodies. The fields of application where the properties of the metallic oxides are utilized are, for instance, wet filters, Gooch crucibles for alkaline liquids, porous plates permitting the passage of air adapted for use in connection with clarification plants, highly refractory linings, plates for surface combustion and the like.

It has already been proposed to manufacture porous objects by sintering metallic oxides. The porosity was, however, attained with the aid of low sintering temperatures or by adding foreign binding agents, i. e., binders the substance of which is different from that of the oxides. Consequently, such bodies neither had a high mechanical strength and chemical resistance, nor was it possible to manufacture them with a sufficiently accurate predetermined porosity.

The object of my invention is to provide a method whereby definite sizes of grain are obtained by passing through a screen prefired or fused and disintegrated substances which are free from detrimental mixtures, particularly from argillaceous substances and such containing silicic acid.

The grains thus obtained are treated with a slip to form a suitable composition, the slip being obtained from calcined material, i. e., from a material fired at a temperature below 1600° C. activated with diluted acid. The resulting crumbly mass is molded to form the desired bodies, preferably by pressing or ramming and then sintered at a temperature above 1600° C. By passing the material through two fine-meshed screens according to the standards of the German industry a material is obtained, the grains of which have a very uniform size. By adding an activated slip thereto as described, the adherence during the molding process and the sintering is supported in spite of the absence of a binding agent. The pressing is carried out at a relatively low pressure of about 10 kg/cm$^2$ to 100 kg/cm$^2$.

The porous plates for clarification plants according to the method of my invention have the advantage over those heretofore employed in that they have a longer life. Known plates molded with the aid of binding agents are dissolved by the alkali present in the water so that the plates disintegrate after a certain period. Furthermore, the size of the pores as well as the action vary during the operation and the air forced through the pores of the plate forms bubbles of prohibitive size, whereby the growth of the bacteria is impaired.

Plates for surface combustion manufactured according to the novel method are highly refractory. As a result of the uniform size of the pores, an intimate mixture of fuel and air is effected and a complete combustion and favorable utilization of heat are thereby obtained.

Linings for furnaces made in accordance with my invention prevent to a great extent the dissipation of heat to the atmosphere owing to the porosity thereof, although they consist of substances which are highly heat-conductive in a highly sintered state. They constitute an excellent heat protection, and enhance, therefore, the efficiency of such furnaces. Moreover, they are highly refractory.

My invention is not limited to the above fields of application but is also applicable to those fields of application in which highly sintered porous objects of metallic oxides or mixtures or compounds of such substances may be of advantage.

I claim as my invention:

1. A porous article consisting of grains of fired refractory metallic oxide and of finely divided calcined particles of metallic oxide.

2. A porous article consisting of uniform grains of prefired refractory metallic oxide and of finely divided calcined particles of metallic oxide.

3. The process of manufacturing porous articles, which consists in screening prefired refractory finely divided metallic oxide to obtain a definite size of grain, mixing the grains thus obtained with a slip consisting of finely divided calcined metallic oxide material activated with diluted acid to obtain a formable crumbly mass, molding the mass under pressure and sintering it at a temperature above 1600° C.

4. The process of manufacturing porous articles which consists in screening refractory finely divided metallic oxide fired at a temperature above 1600° C. to obtain a definite size of grain, mixing the grains thus obtained with a slip consisting of finely divided calcined oxide material activated with diluted acid to obtain a formable mass, molding the mass under pressure and sintering it at a temperature above 1600° C.

5. In a process of manufacturing porous articles of substantially pure metallic oxides, the steps comprising, taking oxide material which has been prefired at a temperature above 1600° C., screening said material to obtain grains of predetermined substantially uniform size, mixing said grains with a plastic composition consisting of calcined substantially pure metallic oxide to obtain a formable mass, forming an article from said mass, and then sintering said article at a temperature above 1600° C.

6. In a process of manufacturing porous articles of substantially pure metallic oxides, the steps comprising, taking oxide material which has been prefired at a temperature above 1600° C., treating said material to obtain grains of predetermined substantially uniform size, taking substantially pure calcined metallic oxide material which has been fired at a temperature below 1600° C. and forming a slip therefrom without the addition of a foreign binding agent, mixing said grains with said slip to obtain a formable mass, processing said mass to form said articles, and then sintering said articles at a temperature above 1600° C.

REINHOLD REICHMANN.